United States Patent
Bugnet et al.

(10) Patent No.: US 6,649,305 B1
(45) Date of Patent: Nov. 18, 2003

(54) SECONDARY ELECTROCHEMICAL GENERATORS OF THE ZINC-ANODE ALKALINE TYPE

(75) Inventors: Bernard Bugnet, Le Plessis-Trevise (FR); Denis Doniat, Paris (FR)

(73) Assignee: S.C.P.S. Societe de Conseil et de Prospective Scientifique S.A., Rosny Sous-Bois (FR)

( * ) Notice: Subject to any disclaimer, the term of this patent is extended or adjusted under 35 U.S.C. 154(b) by 0 days.

(21) Appl. No.: 09/492,609

(22) Filed: Jan. 27, 2000

(30) Foreign Application Priority Data

Jan. 27, 1999 (FR) .............................. 99 00859

(51) Int. Cl.$^7$ .......................... H01M 4/48; H01M 4/62; H01M 4/58
(52) U.S. Cl. .................... 429/231; 429/215; 429/231.5; 429/231.6
(58) Field of Search ................................ 429/229, 231, 429/215, 231.5, 231.6

(56) References Cited

U.S. PATENT DOCUMENTS

| | | | | |
|---|---|---|---|---|
| 4,084,047 A | * | 4/1978 | Himy et al. ................. | 429/206 |
| 4,091,178 A | * | 5/1978 | Kordesch ..................... | 429/60 |
| 4,948,682 A | * | 8/1990 | Sonneveld ................... | 429/67 |
| 5,122,375 A | | 6/1992 | Sklarchuck et al. ........ | 429/229 |
| 5,206,096 A | | 4/1993 | Goldstein et al. ............. | 429/27 |
| 5,721,072 A | * | 2/1998 | Mototani et al. ........... | 429/229 |

FOREIGN PATENT DOCUMENTS

| | | |
|---|---|---|
| FR | 2276699 | 1/1976 |
| GB | 2028569 | 3/1980 |
| JP | 60208053 | 10/1985 |
| JP | 02075160 | 3/1990 |
| JP | 06318456 | 11/1994 |

OTHER PUBLICATIONS

Hawley's Condensed Chemical Dictionary, 11th ed., pp. 240 & 1033. 1987 (no month).*

* cited by examiner

Primary Examiner—Stephen Kalafut
Assistant Examiner—Tracy Dove
(74) Attorney, Agent, or Firm—Sturm & Fix LLP

(57) ABSTRACT

Secondary electrochemical generators of the zinc-electrode alkaline type whose anode has a great capacity for cycling. The electrochemical generators according to the invention comprise zinc anodes made in such a manner as to increase within the active material the number of sites for formation of zinc during recharging, by a better draining of the electrical charges, obtained by using a dispersed secondary collector in the form of a conductive powder in the active mass, to which may advantageously be associated a principal support-collector of the high porous three-dimensional structured type having a high developed surface. These generators thus have zinc electrodes of improve cyclability, the number of charges and discharges that the electrode can perform under different regimes being increased.

25 Claims, No Drawings

SECONDARY ELECTROCHEMICAL GENERATORS OF THE ZINC-ANODE ALKALINE TYPE

BACKGROUND OF THE INVENTION

1. Field of the Invention

The present invention concerns the field of electrochemical generators, and more particularly the field of accumulators.

It specifically relates to generators having a zinc anode and aims to provide the zinc electrode with a high recycling capability.

2. Description of the Prior Art

Because of its high performance the zinc electrode has long been a subject of interest for persons skilled in the art, and has been used in different types of secondary electrochemical systems: zinc-air, nickel-zinc, silver-zinc, bromium-zinc and chlorine-zinc generators.

Zinc constitutes a particularly attractive active electrode material having a strongly negative redox potential. The zinc electrode has a theoretical capacity per mass of 820 Ah/Kg and enables theoretical power per mass ratios of 334 Wh/Kg for the nickel-zinc couple, and 1,320 Wh/Kg for the zinc-oxygen couple. For Ni—Zn accumulators, the practical power per mass is usually situated between about 15 and 80 Wh/Kg, which is comparable to that of the Pb—$PbO_2$ couple, which is of the order of 25 to 30 Wh/kg.

It should also be emphasized that the advantages of zinc include, on the one hand, its property of non-toxicity for the environment (manufacturing, use, waste), on the other hand, its low cost, much less than that of other anodic materials for alkaline accumulators (cadmium and metallic hydrides).

However, still in the relation to alkaline accumulators, the industrial development of rechargeable systems using a zinc electrode has encountered one major difficulty, the insufficient electrode life-time when cycled.

Hence, in secondary systems having an alkaline electrolyte, the formation of deposits whose structure is modified relative to the original morphology, most usually dendrites or powdery deposits, leads to recharging the zinc electrode from its oxides and hydroxides and zincates. This phenomenon furthermore takes place throughout a large range of current densities.

Dendridic-type deposits rapidly lead to growth of zinc protuberances through the separators and to short-circuiting with electrodes of opposite polarity, for example with a nickel cathode in the case of Ni—Zn.

As for powder-type deposits, they most usually are not of such nature as to permit the reconstitution of electrodes capable of satisfactory operation, because the adherence of the active material on the support is insufficient.

Furthermore, the reduction of oxides, hydroxides and zincates to zinc on the anode, during recharging, is also characterized by changes of morphology of the said electrode. Depending upon the modes of operation of the accumulators, different types of modifications in the anode shape are observed, by a phenomenon of non-uniform redistribution of the zinc during its formation, which can in particular manifest itself by an undesirable densification of the active anode mass.

These severe handicaps reduce the number of cycles that can be carried out down to only several tens of cycles, which is insufficient to make the systems economically viable. This has lead to a great deal of work aiming to improve the characteristics of the deposit when recharging, with a view to increasing the number of charging-discharging cycles.

Extremely diverse ways have been explored to delay as long as possible both the dendridic growth and the non-uniform redistribution of the zinc. Amongst these ways, the following in particular should be noted:

the addition of additives incorporated in the electrolyte or in the active anode material, notably intended to limit the solubility of zincates;

the use of mechanical processes aiming to reduce the formation of dendrites and to avoid powdery deposits (circulation of the electrolyte and/or of the zinc electrode in a dispersed phase);

control of the charging parameters (current, voltage, . . . ); the use of pulsed currents; or to delay the consequences of the dendridic growth, also the use of separators resisting the formation of dendrites, notably microporous separators or even exchange membranes.

These various techniques can be implemented singly or in combination.

The positive effects thereof are in any event limited, and have proven to be insufficient to make zinc-electrode secondary generators, in particular the Ni—Zn couple which however is theoretically very attractive, approach economic viability.

Certain of these techniques additionally have penalizing negative effects: increase of the internal resistance of the accumulator, degradation of the cathode life-time, notably when using certain additives; also the mechanical complexity of operation, increase of the volume, the mass, and cost.

As a result of the growing need for portable energy sources and rechargeable systems, for supplying portable electric or electronic apparatus, for supplying the increased amount of electronic equipment in automobiles, or for the propulsion of electric or hybrid vehicles, ways for simultaneously meeting up to the following quality criteria ought to be made available:

high performances per mass and per volume;

low cost, compared to other types of existing secondary alkaline systems;

absence of toxicity.

BRIEF SUMMARY OF THE INVENTION

The aim of the present invention is to provide a new, original and satisfactory solution for recharging the zinc-electrode by the production of a homogenous and non-dendritic deposit which enables several hundreds of cycles to be carried out through a large range of operating conditions.

The characteristics obtained result from the means of implementation whose purpose is to increase the utilization of active material by improving percolation of the electrical charges, and increasing the charge-discharge efficiency.

DETAILED DESCRIPTION OF THE INVENTION

According to the present invention, a remarkable improvement of the zinc-electrode cyclability is obtained by including in the active material fine particles of conductive materials that are stable in the electrolytic medium and have a high hydrogen over-potential.

Within the framework of the present invention, several complementary methods are proposed to reinforce the zinc-electrodes cyclability, in particular the use of a collector of high developed surface area, of the type of a three-dimensional metal or metalized highly porous structure within which is contained a compacted plastified electrode.

The addition of an anti-polar mass into the active anodic mass constitutes another of these complementary efficient methods within the framework of the invention.

In general, the present invention may be carried out alone or in combination with some or all of the known techniques aiming to improve the cyclability of the zinc-electrode.

Thanks to the present invention, it has been shown that to improve the quality of the zinc deposit during recharging, it was important to favorize good draining of the electronic charges within the anode, given that, in the discharged state, the anode's active material is constituted essentially of zinc oxide (ZnO), which is poorly conductive.

An insufficient draining of the electrical charges within the active material tends to favorize the formation of the zinc deposit during recharging at sites which represent only a limited percentage of the total of the active mass. Consequently, it is from sites whose total surface area is limited relative to the overall developed surface area of the anodic material that this growth of zinc takes place. This phenomenon leads most often to a deposit of dendritic type. It can be understood that this mechanism may be strongly reduced if one is able to produce a deposit of the same total quantity of zinc on a much larger surface area, by multiplying the sites for formation of the deposit. The number of these sites should thus be significantly increased to enable the thickness of the deposit at any point to be reduced, and such that this does not appear in the form of protuberances, for example of dendritic type.

The present invention is designed to achieve this purpose, through using a dispersion of conductive particles in the electrode, playing the role of a secondary conductor within the active mass.

The invention is advantageously associated with, but not limited to, use of a highly porous three-dimensional structure as principle anodic support and collector, which structure may also efficiently contribute to increasing the efficiency of use of the active material.

According to the invention, it is proposed to include in the active anodic mass a certain quantity of fine powder as a dispersion, of an electrically conductive material that may, because of this property, play the role of a secondary additional conductor, dispersed within the active material. The particles of this conductive material also serve as collector relays for the charges between the principle collector (electrode support) and grains of the active material that are not in contact with said principle collector. The dispersion of conductive particles according to the invention therefore contributes to transfer of the electrical charges in the active material, notably by percolation.

It is noted here that the use of fine particles of graphite mixed with an active electrode material has been described in patent GB 2 054 252, in order to provide an improvement in the zinc-electrode's cyclability.

Duffield et al (Power Sources 11 —International Power Sources Symposium Committee Leatherhead—Surrey—1990) have shown that for graphite particles the particle sizes constituted an important parameter and that the smaller the particle size (2 to 5 microns), the greater the cyclability of the electrode. The authors of this article indicate that the reduction of the oxidized zinc species into metallic zinc is facilitated to the extent that these species may be adsorbed by the conductive graphite. It can be seen that the reasoning having led to the use of graphite powders was different than that pursued by the inventors of the present invention who are not seeking adsorption of oxidized zinc species, but the reinforcement of draining electronic charges throughout the active mass to provide a better utilization thereof.

Moreover, the use of small graphite particles has certain major drawbacks. There can be a non-negligible cost problem when microparticles are used. The addition of carbon as specified (in an amount of 1 to 50% of the active mass according to patent GB 2 054 252) also leads to a loss of the electrode's capacity per volume because of the low packed density of these powders. Lastly, and as indicated by the authors, during operation the use of graphite powders causes an important swelling of the anode, which increases with the quantity of the graphite added.

To palliate these drawbacks, and to fully achieve their objectives, the inventors of the present invention have identified very conductive materials that are chemically stable in alkaline media and are in the form of micronic or submicronic particles, of high packed density, also offering a sufficiently high hydrogen evolution over-voltage to allow charging of the zinc electrode with a high efficiency, and limiting self-discharging of the zinc.

The materials preferentially used for fulfilling this function according to the invention, but without limiting it, are conductive ceramics. The latter may notably be selected from amongst single or double borides, carbides, nitrites and silicides, alone in combination, of various metals such as hafnium, magnesium, niobium, titanium and vanadium. They can advantageously be nitride and/or carbide of hafnium, and/or carbide and/or nitride and/or silicide of magnesium, and/or carbide and/or nitride of niobium, and/or carbide and/or nitride and/or silicide of titanium, and/or vanadium nitride. It is also possible to use ceramic materials such as titanium sub-oxides of the general formula $T_{1_n}O_{2_{n-1}}$, where n is comprised between 4 and 10. For any of the above, the ceramics may be selected for use within the framework of the present invention, to the extent that they fulfill the above-indicated essential characteristics: they must be conductive, chemically inert in the accumulator, and have a high hydrogen over-voltage.

To efficiently carry out their role, the conductive powders used should be fine and should be dispersed as homogeneously as possible in the active mass.

The zinc-electrode according to the invention, enclosing within its active mass the dispersion of inert conductive powder, may use supports of most varied types, such as in particular sheet metal, perforated sheet metal, expanded metal, grids, and woven structures.

According to a complementary approach proposed within the framework of the present invention and based on the same logic, it is however particularly advantageous to employ a support that efficiently complements the effect procured by the use of conductive powders dispersed in the active mass.

According to the invention it is proposed to make the zinc-electrode by pasting, dipping or filling by any means, in the liquid or dry phase, a high porosity three-dimensional metallic support, with a paste containing notably zinc-oxide powder, a dispersion of conductive particles that are chemically inert in the medium, a plastifying agent and possibly a suspension promoting agent.

By metallic or metalized highly porous three-dimensional structures it is intended to designate structures with a large developed surface of the types like foam, felt or woven fabric having a great amount of open porosity, having the aspect of a dense network of fibers or openings having a three-dimensional skeletal structure, defining a plurality of open spaces communicating with one another and with the outside of the structure.

Foams are alveolar reticulated structures of high porosity (greater than 80%, and able to reach approximately 98%) having an open porosity by "desoperculation" (breaking of the pore walls) wherein the pores of the network communicate fully with one another, or at least to a large proportion.

Felts are random entanglements of non-woven fibers (however for the greater part thereof positioned substantially in the plane of the "mat" thus constituted), defining therebetween inter-fiber spaces of variable shapes and dimensions intercommunicating with one another. Their fibers may or may not be bonded by a binding agent.

Woven fabrics are structures constituted by an assembly of interlaced textile threads or fibers, either woven or knitted. They may be in the form of thick complex structures, notably when they are made up of two external woven faces inter-connected by knitted threads that maintain them spaced apart, as for example can be made using Raschel type looms.

These various three-dimensional structures—subject to adequate matching of their dimensions relative to the electrode thickness and the size of the support's internal apertures—can constitute dense electrical collection networks within the active material. As the latter, instead of being conventionally deposited on the surface of an essentially planar support, fills the open inside space of the open internal architectural configuration and hence the entire inner porosity of the support, it is possible to increase the direct contact surface betwen the principal collector and the active material, due to the increase of the developed suface area of the support. This configuration moreover permits, within the electrode asssembly, a reduction of the maximum distance separating any particle of active material from the closest point of the neighboring net or fibre of the metallic collector. An "intimate" contact is therefore provided between any point of the active mass and the principal collector or support. This embodiment enables an increase in the efficiency of use of the active material and, during recharging, a multiplication of the sites where zinc deposits are formed within the entire electrode volume.

It should be added that the use of a high porosity three-dimensional structure for the electrode's principal support and collector enables optimization of the retentive power of the active material, and therefore also, because of this property, contributes to increasing the zinc anode's life-time and conservation of its initial capacity.

The two described approaches within the context of the invention, namely the use of a dispersion of conductive powders whose role is as secondary collector within the active material on the one hand, and possible complementary use of a three-dimensional high porosity principal support collector having a developed large surface on the other hand, provide their full effect by their combined implementation. As has been stated above, it is however possible to associate the dispersion of conductive powders with any type of electrode support.

Secondary generators incorporating zinc electrodes according to the present invention are adapted to withstand a large number of charging-discharging cycle. Hence, Ni—Zn accumulators can withstand several hundreds of cycles, for example at a C to C/5 rate (charging and discharging in 1 to 5 hours), with percentage discharging of the zinc electrode able to reach 75 to 100%.

Carrying out the invention will be better understood with reference to the following non-limiting description of the invention.

To produce a non fluid-tight nickel-zinc accumulator of prismatic configuration, an alveolar reticulated foam or a felt (non-woven) is preferably, but without limiting the invention, used as principal support and collector for the anode.

These structures can be made of any metal or alloy, especially electron chemically depositable ones, and preferably but without limiting the invention, of nickel and/or copper, because of the electrical properties of these constituents and incidentally their mechanical properties. It may be useful to coat them with a protective fluid-tight coating of a metal or alloy having a high hydrogen overvoltage, so that a direct contact between for example nickel or copper on the one hand and zinc or electrolyte on the other hand can be avoided. This enables avoidance on the one hand of risks of corrosion and self-discharge of the zinc if it should come into contact notably with nickel, and on the other hand the risk of corrosion of copper notably in contact with the electrolyte. The support's protective coating layer may notably made of silver and/or bismuth and/or cadmium and/or tin and/or lead. This coating can be applied by electrolytic, chemical, vacuum or powder deposition, notably.

The collector could also be integrally made from any one of these metals, but there would then be a risk, depending on the selection, of a weight, conductivity or cost penalty for the anode.

In the case of use of a foam-type collector, the latter is advantageously selected from standard 40 to 110 ppi (pores per inch) foams, i.e. having between about 15,and 45-pores per linear centimeter of the surface. More open foams are easier to use during filling of the structure with active mass: to the contrary, foams with smaller pores provide a denser collector network and consequently a greater direct contact surface with the zinc powder on the one hand, and a lesser maximal distance with the zinc particles that do not take advantage of this direct contact, on the other hand, finally an increased capacity for mechanical retention of the active material.

In the case where a non-woven metal is used as principal collector, it is advantageous to use a product having a porosity greater than or equal to 95%, and having inter-fiber openings essentially comprised between 50 and 300 microns.

The collectors used are advantageously made of copper or nickel, having densities of 150 to 650 grams per square meter of apparent surface, and preferably from 200 to 450 $g/m^2$. Their thickness is usefully comprised between 0.9 and 5.0 millimeters, preferably between 1.3 and 3.0 millimeters.

The collectors are preferably coated with a protective layer of lead or silver. The chosen thickness for this layer corresponds advantageously to the minimum threshold necessary to obtain a fully efficient protective coating. Above this threshold, any excess thickness constitutes a penalty in terms of the capacity per mass, and to a lesser extent the capacity per volume.

The active anodic mass is advantageously prepared in the form of a paste comprising the following elements:

zinc oxide power;

conductive particles forming a secondary collector;

a plastifying agent;

a suspension-promoting agent.

It seems advantageous to select zinc oxide powder having large developed surfaces relative to their apparent surface area, in order to maximize the surface upon which the zinc deposits during recharging.

The conductive particles according to the invention may advantageously be selected wholly or partly from amongst ceramic conductors and notably may be made of nitrides of titanium and/or of hafnium that fully embody the sought-after properties in terms of conductivity, hydrogen overvoltage, density, neutrality as regards the electrochemical system, and cost. Carbides of titanium and/or hafnium, as well as titanium suboxides may also be used.

For these particles a granulometry essentially less than about 10 microns, and notably submicronic, is advantageously selected, and a concentration by weight relative to zinc oxide is usefully comprised between 1 and 20%, preferably between 3 and 17%. Lower concentrations are in most cases insufficient to obtain the desired effect: higher concentrations usually do not provide significant additional advantages, whereas they penalize the electrodes in terms of its capacity per mass and per volume, and consequently penalize the accumulator in terms of the power per mass and per volume.

It should be noted that logically for a given electrode cycling capability, the concentration of conductive particles must be all the greater as the developed surface of the principal collector diminishes. For the same electrode thickness this capacity is hence greater for a collector of the perforated or expanded metal type for example, relative to the capacity with a metal foam, and in like manner is greater with a foam having 15 pores per linear centimeter than with a foam having 45 pores per linear centimeter.

The plastifying agent, whose function is to contribute to the cohesion of the active mass within the principal collector by the fibrillization effect, may advantageously be P.T.F.E. added notably in the form of a 60% aqueous suspension, the concentration of P.T.F.E. in the electrode being established between about 2 and 6% relative to the weight of the active material. Polyvinylalcohol or ethylene poly-oxide may also be used for example.

The suspension agent used in the case of active mass made in paste form is preferably either water or alcohol, or a mixture thereof. According to the type of support used and the method of, introducing the paste therein, the most suitable fluidity or viscosity will be chosen. In the case where a reticulated foam or non woven type of support is used, in order to obtain optimal performance the porosity of the support should be integrally filled with active mass.

Once it has been introduced within a three-dimensional metallic support according to the invention, the active mass must be dried, and the electrode thus constituted is advantageously compacted. The purpose of this compacting is to provide the electrodes with a better mechanical coherence, by compressing the mesh or fibers of this support about and within the active mass. It also enables better performance per volume to be obtained.

This compacting must however be carried out under controlled and limited pressures, so as not to result in closing of the electrode's porosity, which would lead to defective operation. For electrodes with a nickel foam coated with lead or silver, it is advantageous to use compacting pressures comprised between about 40 and 120 kg per square centimeter. According to the invention, it is usual and advantageous to hence reduce the electrode thickness to between one third and a half of its initial thickness before compacting, which most often provides a final thickness comprised between about 0.5 and 1.5 millimeters.

Within the framework of the present invention, additives for various functions may advantageously be added to the basic components of the active mass.

One may thus add for example bismuth oxide, $Bi_2O_3$, and/or cadmium oxide, CdO, and/or lead oxide, PbO, alone or in combination, in a ratio of about 3 to 15% per weight relative to the zinc oxide.

Powder zinc may also be mixed with the zinc oxide.

Still without departing from the framework of the present invention, an antipolar mass, such as nickel hydroxide, $Ni(OH)_2$, in a Ni—Zn accumulator, may be introduced in an amount of 2 to 7% per weight relative to ZnO.

It is also advantageous to add to the active mass alkaline earth hydroxides such as for example calcium hydroxide, $Ca(OH)_2$, in order to reduce the solubility of the zincates, in an amount of about 5 to 35% by weight relative to the ZnO.

Other additives intended to favorize cycling of the zinc electrode may also be introduced into the electrolyte. The latter is advantageously caustic potash, KOH, of a concentration less than or equal to 10 N. Additives to this electrolyte are notably zincates, fluorides or carbonates, whose use in generators with zinc electrodes is well described in the literature.

For use in a nickel-zinc accumulator, one may, as a function of the envisaged modes of application, associate zinc electrodes according to the invention with nickel cathodes of various types: electrodes made by impregnation or pasting sintered supports or highly porous three-dimensional supports (foams, woven and non woven tissues), or also pocket-like electrodes.

In the case of plastified nickel pasted electrodes in highly porous three dimensional supports in prismatic accumulators, there is a preference for nickel hydroxides of irregular shapes and high packed density, such as that whose method of manufacture is described in French patent 92 02873 (2.688.235), in order to favorize both a good retention of the active material in its support-collector and high capacity levels of the cathode.

According to a possible non-limiting embodiment of the invention of a Ni—Zn accumulator, use is made of a combination of two separators between electrodes of opposite polarity. One is a microporous membrane, such as that offered under the Trademark "Celgard" by Hoescht Celanese. The other is a non woven polyamide or polypropylene separator such as the product "FS2115" of Messers Carl Freudenberg.

Of course, and as is clear from the preceding description, the invention is not limited to the specific described embodiments given by way of example. The invention is not limited to the given examples, but includes all variations.

What is claimed is:

1. A secondary zinc-anode alkaline electrochemical generator comprising an electrode support as a principle collector, and a solid active mass containing zinc oxide and, dispersed as homogeneously as possible in the active mass, a powder of an electrically conductive material, at least in part a conductive ceramic, that is chemically inert in the generator and has a high hydrogen-evolution over potential, wherein the electrically conductive material functions as a secondary collector dispersed within the solid mass and wherein the powder is at least in part constituted of a compound selected from the group consisting of hafnium nitride, hafnium carbide, magnesium carbide, magnesium nitride, magnesium silicide, niobium carbide, niobium nitride, titanium carbide titanium nitride, titanium silicide, vanadium nitride, and double carbides or nitrides of any two of the metals hafnium, magnesium, niobium, titanium and vanadium.

2. The generator according to claim 1, wherein the powder is at least in part constituted of titanium suboxides.

3. The generator according to claim 1, wherein the powder has a granulometry less than 10 microns.

4. The generator according to claim 1, wherein the powder is included in the active mass in a proportion comprised between 1% and 20% by weight relative to zinc oxide.

5. The generator according to claim 1, wherein a zinc electrode is produced by inserting an active anode mass enclosing the powder into a three-dimensional high porosity metallic or metalized support-collector of reticular alveolar foam, felt or woven fabric.

6. The generator according to claim 5, wherein the support-collector is made of a metal or alloy coated with a protective fluid-tight layer.

7. The generator according to claim 5, wherein the support-collector is made of copper or nickel, coated with a fluid-tight protective coating of a metal or alloy having a high hydrogen overpotential.

8. The generator according to claim 5, wherein the support-collector is made of copper-or nickel, and coated with a fluid-tight protective layer of at least one of silver, bismuth, cadmium, tin, and lead.

9. The generator according to claim 5, wherein the support-collector is a reticulated alveolar foam.

10. The generator according to claim 5, wherein the support-collector is a reticulated alveolar foam having a surface comprising between about 15 and 45 pores per linear centimeter at the surface.

11. The generator according to claim 5, wherein the support-collector has a density comprised between 150 and 650 grams per square meter of the apparent surface, exempting a protective layer.

12. The generator according to claim 5, wherein the support-collector has a thickness before compacting the electrode comprised between 0.9 and 5 millimeters.

13. The generator according to claim 5, wherein the active mass of the zinc electrode is introduced into the support-collector in the form of a paste comprising zinc oxide, a dispersion of fine conductive powder chemically inert in the generator, a plastifying agent, and an agent for promoting suspension.

14. The generator according to claim 5, wherein after the active mass is inserted, the zinc electrode is compacted without closing its internal porosity.

15. The generator according to claim 5, wherein after insertion of the active mass the zinc electrode is compacted-at compacting pressure comprised between 40 and 120 Kg/square centimeter.

16. The generator according to claim 5, wherein an antipolar mass is added as additive to the active mass of the zinc electrode.

17. The generator according to claim 1, wherein an antipolar mass is included in the active mass of the zinc electrode in an amount of 2% to 7% by weight relative to zinc oxide.

18. The generator according to claim 1, wherein an antipolar mass introduced into the active mass of the zinc electrode is nickel hydroxide.

19. The generator according to claim 1, wherein the active mass of the zinc electrode contains one or more additives for improving operation of the generator.

20. The generator according to claim 5, wherein the active mass of the zinc electrode contains one or more additives for improving operation of the generator.

21. The generator according to claim 19, wherein the additives are selected from the group consisting of bismuth oxide, cadmium oxide, lead oxide, powdered zinc, and alkaline earth hydroxides, alone or in combination.

22. The generator according to claim 20, wherein the additives are selected from the group consisting of bismuth oxide, cadmium oxide, lead oxide, powdered zinc, and alkaline earth hydroxides, alone or in combination.

23. A secondary zinc-anode alkaline electrochemical generator comprising an electrode support as a principle collector, and a solid active mass containing zinc oxide and, dispersed as homogeneously as possible in the active mass, a powder of an electrically conductive material, at least in part a conductive ceramic, that is chemically inert in the generator and has a high hydrogen-evolution overpotential, wherein the electrically conductive material functions as a secondary collectors dispersed within the solid mass and wherein the powder is at least in part constituted of titanium suboxides.

24. A secondary zinc-anode alkaline electrochemical generator comprising an electrode support as a principle collector, and a solid active mass containing zinc oxide and, dispersed as homogeneously as possible in the active mass, a powder of an electrically conductive material, at least in part a conductive ceramic, that is chemically inert in the generator and has a high hydrogen-evolution overpotential, wherein the electrically conductive material functions as a secondary collector dispersed within the solid mass and, wherein a zinc electrode is produced by inserting an active anode mass enclosing the powder into a three-dimensional high porosity metallic or metalized support-collector of reticulated alveolar foam having a surface comprising between about 15 and 45 pores per linear centimeter at the surface.

25. A secondary zinc-anode alkaline electrochemical generator comprising an electrode support as a principle collector, and a solid active mass containing zinc oxide and, dispersed as homogeneously as possible in the active mass, a powder of an electrically conductive material, at least in part a conductive ceramic, that is chemically inert in the generator and has a high hydrogen-evolution overpotential, wherein the electrically conductive material functions as a secondary collector dispersed within the solid mass and wherein an antipolar mass introduced into the active mass of the zinc electrode is nickel hydroxide.

* * * * *